United States Patent
Vito et al.

(10) Patent No.: US 7,150,113 B2
(45) Date of Patent: Dec. 19, 2006

(54) VIBRATION DAMPENING MATERIAL AND METHOD OF MAKING SAME

(75) Inventors: Robert A. Vito, Berwyn, PA (US); Carmen N. DiMario, West Chester, PA (US); Thomas Falone, Mickleton, NJ (US)

(73) Assignee: Sting Free Technologies Company, Berwyn, PA (US)

( * ) Notice: Subject to any disclaimer, the term of this patent is extended or adjusted under 35 U.S.C. 154(b) by 267 days.

(21) Appl. No.: 10/958,611

(22) Filed: Oct. 5, 2004

(65) Prior Publication Data

US 2005/0060908 A1    Mar. 24, 2005

Related U.S. Application Data

(60) Continuation-in-part of application No. 10/856,215, filed on May 28, 2004, now Pat. No. 6,942,586, which is a continuation of application No. 10/659,560, filed on Sep. 10, 2003, now Pat. No. 6,935,973, which is a division of application No. 09/939,319, filed on Aug. 27, 2001, now Pat. No. 6,652,398.

(51) Int. Cl.
*A43B 13/38* (2006.01)

(52) U.S. Cl. .......................................... 36/44; 36/30 R

(58) Field of Classification Search ................. 36/44, 36/30 R, 25 R, 31, 153, 154
See application file for complete search history.

(56) References Cited

U.S. PATENT DOCUMENTS

| | | |
|---|---|---|
| 1,125,029 A | 1/1915 | Lard |
| 1,195,994 A | 8/1916 | Lard |
| 1,498,838 A | 6/1924 | Harrison, Jr. |
| 1,551,203 A | 8/1925 | Mills |
| 1,620,118 A | 3/1927 | Mattern |
| 1,701,856 A | 2/1929 | Kraeuter |
| 2,023,131 A | 12/1935 | Gibson |
| 2,099,521 A | 11/1937 | Herkimer et al. |
| 2,871,899 A | 2/1959 | Coyle et al. |
| 3,353,981 A | 11/1967 | Jacob |
| 3,606,326 A | 9/1971 | Sparks et al. |
| 3,716,433 A | 2/1973 | Plummer |
| 3,779,551 A | 12/1973 | Wilson |
| 4,015,851 A | 4/1977 | Pennell |
| 4,044,625 A | 8/1977 | D'Haem et al. |
| 4,134,198 A | 1/1979 | Briggs |
| 4,143,109 A | 3/1979 | Stockum |
| 4,147,443 A | 4/1979 | Skobel |
| 4,197,611 A | 4/1980 | Bell et al. |
| 4,261,567 A | 4/1981 | Uffindell |
| 4,268,574 A | 5/1981 | Peccenini et al. |
| 4,338,270 A | 7/1982 | Uffindell |
| 4,347,280 A | 8/1982 | Lau et al. |
| 4,417,042 A | 11/1983 | Dziark |
| 4,483,972 A | 11/1984 | Mitchell |
| 4,552,713 A | 11/1985 | Cavicchioli |
| 4,591,160 A | 5/1986 | Piragino |
| 4,597,578 A | 7/1986 | Lancaster |
| 4,613,537 A | 9/1986 | Krupper |
| 4,660,832 A | 4/1987 | Shomo |
| 4,736,949 A | 4/1988 | Muroi |

(Continued)

FOREIGN PATENT DOCUMENTS

DE     2805314     8/1979

(Continued)

*Primary Examiner*—Ted Kavanaugh
(74) *Attorney, Agent, or Firm*—Volpe and Koenig, P.C.

(57) ABSTRACT

An insert for a shoe formed by a reinforced elastomer material that regulates and dissipates vibration.

20 Claims, 5 Drawing Sheets

U.S. PATENT DOCUMENTS

| | | | |
|---|---|---|---|
| 4,819,939 | A | 4/1989 | Kobayashi |
| 4,864,738 | A | 9/1989 | Horovitz |
| 4,912,836 | A | 4/1990 | Avetoom |
| 4,919,420 | A | 4/1990 | Sato |
| 4,948,131 | A | 8/1990 | Nakanishi |
| 4,953,862 | A | 9/1990 | Uke et al. |
| 4,983,242 | A | 1/1991 | Reed |
| 4,989,643 | A | 2/1991 | Walton et al. |
| 5,005,254 | A | 4/1991 | Uffindell |
| 5,042,804 | A | 8/1991 | Uke et al. |
| 5,083,780 | A | 1/1992 | Walton et al. |
| 5,088,734 | A | 2/1992 | Glava |
| 5,110,653 | A | 5/1992 | Landi |
| 5,122,405 | A | 6/1992 | Landi |
| 5,137,769 | A | 8/1992 | Landi |
| 5,193,246 | A | 3/1993 | Huang |
| 5,199,706 | A | 4/1993 | Chen |
| 5,203,561 | A | 4/1993 | Lanctot |
| 5,240,247 | A | 8/1993 | Didier |
| 5,254,391 | A | 10/1993 | Davis |
| 5,258,088 | A | 11/1993 | Wu |
| 5,261,665 | A | 11/1993 | Downey |
| 5,267,487 | A | 12/1993 | Falco et al. |
| 5,269,516 | A | 12/1993 | Janes |
| 5,282,618 | A | 2/1994 | Hong |
| 5,290,036 | A | 3/1994 | Fenton et al. |
| 5,294,119 | A | 3/1994 | Vincent et al. |
| 5,322,280 | A | 6/1994 | Wu |
| 5,322,285 | A | 6/1994 | Turner |
| 5,322,290 | A | 6/1994 | Minami |
| 5,333,861 | A | 8/1994 | Mills |
| 5,338,600 | A | 8/1994 | Fitchmun et al. |
| 5,348,303 | A | 9/1994 | Swissheim |
| 5,355,552 | A | 10/1994 | Huang |
| 5,362,046 | A | 11/1994 | Sims |
| 5,377,979 | A | 1/1995 | Long |
| 5,384,083 | A | 1/1995 | Dawn et al. |
| 5,395,108 | A | 3/1995 | Souders et al. |
| 5,435,549 | A | 7/1995 | Chen |
| 5,463,824 | A | 11/1995 | Barna |
| 5,511,777 | A | 4/1996 | McNeely |
| 5,516,101 | A | 5/1996 | Peng |
| 5,524,885 | A | 6/1996 | Heo |
| 5,528,842 | A | 6/1996 | Ricci et al. |
| 5,547,189 | A | 8/1996 | Billings |
| 5,575,473 | A | 11/1996 | Turner |
| 5,593,158 | A | 1/1997 | Filice et al. |
| 5,621,914 | A | 4/1997 | Ramone et al. |
| 5,624,114 | A | 4/1997 | Kelsey |
| D379,208 | S | 5/1997 | Kulisek, Jr. |
| 5,636,377 | A | 6/1997 | Wiener |
| 5,653,643 | A | 8/1997 | Falone et al. |
| 5,655,975 | A | 8/1997 | Nashif |
| 5,657,985 | A | 8/1997 | Dahlstrom et al. |
| 5,673,437 | A | 10/1997 | Chase et al. |
| 5,686,158 | A | 11/1997 | Gibbon |
| 5,695,408 | A | 12/1997 | DeLaCruz |
| 5,730,662 | A | 3/1998 | Rens |
| 5,749,798 | A | 5/1998 | Kuebler et al. |
| 5,759,113 | A | 6/1998 | Lai et al. |
| 5,772,524 | A | 6/1998 | Huang |
| 5,789,327 | A | 8/1998 | Rousseau |
| 5,840,397 | A | 11/1998 | Landi et al. |
| 5,842,933 | A | 12/1998 | Lewis |
| 5,843,851 | A | 12/1998 | Cochran |
| 5,858,521 | A | 1/1999 | Okuda et al. |
| 5,912,195 | A | 6/1999 | Walla et al. |
| 5,916,664 | A | 6/1999 | Rudy |
| 5,926,847 | A | 7/1999 | Eibert |
| 5,944,617 | A | 8/1999 | Falone et al. |
| 5,946,734 | A | 9/1999 | Vogan |
| 5,963,989 | A | 10/1999 | Robertson |
| 5,979,081 | A | 11/1999 | Vaz |
| 6,000,062 | A | 12/1999 | Trakh |
| 6,007,439 | A | 12/1999 | MacKay, Jr. |
| 6,030,355 | A | 2/2000 | Callinan et al. |
| 6,077,793 | A | 6/2000 | Hatjasalo et al. |
| 6,216,276 | B1 | 4/2001 | Eibert |
| 6,219,940 | B1 | 4/2001 | Kita |
| 6,231,946 | B1 | 5/2001 | Brown, Jr. et al. |
| 6,318,002 | B1 * | 11/2001 | Ou .................. 36/44 |
| 6,368,989 | B1 | 4/2002 | Pascual et al. |
| 6,416,432 | B1 | 7/2002 | Rosen et al. |
| 6,505,421 | B1 * | 1/2003 | Vaz ................. 36/30 R |
| 6,558,270 | B1 | 5/2003 | Kwitek |
| 6,880,269 | B1 * | 4/2005 | Falone et al. ............ 36/44 |
| 6,944,974 | B1 * | 9/2005 | Falone et al. ............ 36/44 |
| 2001/0008053 | A1 | 7/2001 | Belli |
| 2000/0055994 | | 12/2001 | Kwitek |
| 2002/0144432 | A1 * | 10/2002 | Dennis et al. ............ 36/44 |
| 2004/0048701 | A1 | 3/2004 | Falone et al. |
| 2004/0168355 | A1 * | 9/2004 | Biwand et al. ........... 36/44 |

FOREIGN PATENT DOCUMENTS

GB 458367 6/1935

* cited by examiner

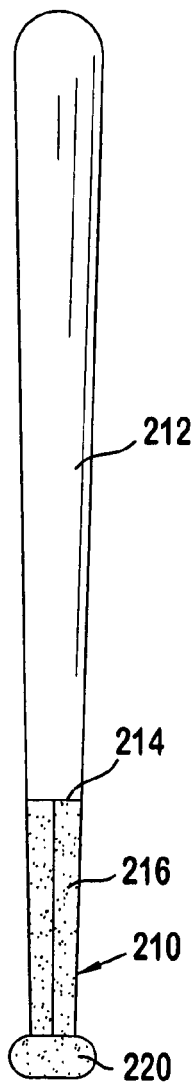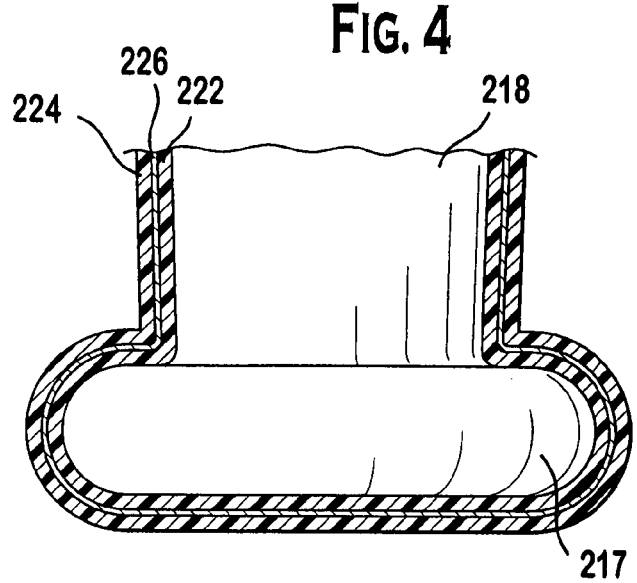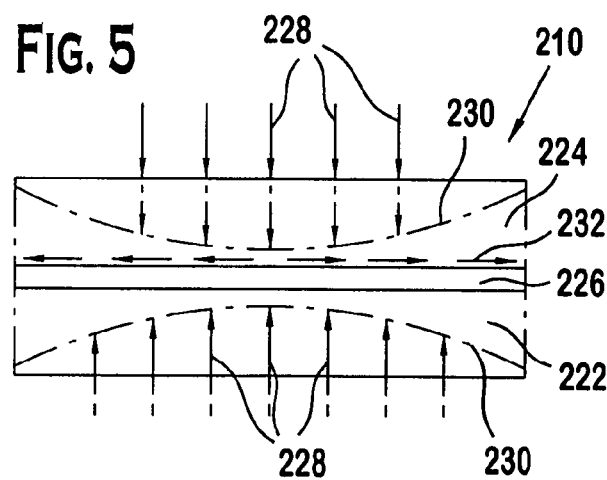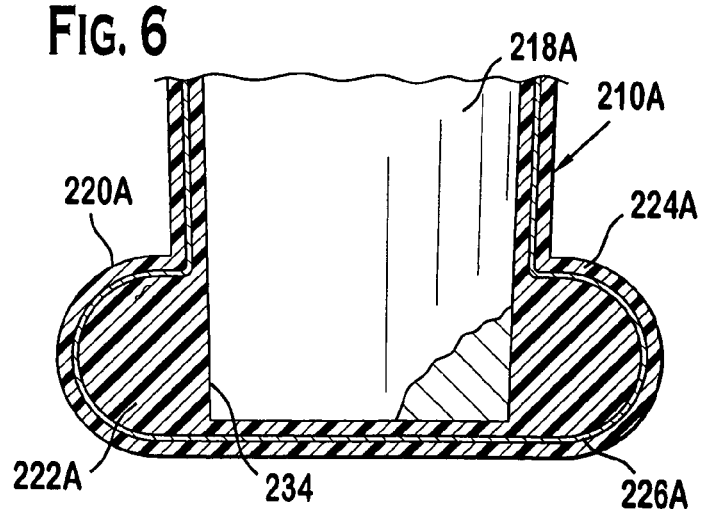

VIBRATION DAMPENING MATERIAL AND METHOD OF MAKING SAME

CROSS REFERENCE TO RELATED APPLICATIONS

This application is a continuation-in-part of U.S. patent application Ser. No. 10/856,215, filed on May 28, 2004, now U.S. Pat. No. 6,942,586, which is a continuation of and claims priority to U.S. patent application Ser. No. 10/659,560, filed on Sep. 10, 2003, now U.S. Pat. No. 6,935,973 which is a divisional of and claims priority to U.S. patent application Ser. No. 09/939,319, filed on Aug. 27, 2001, now U.S. Pat. No. 6,652,398; priority to each of the above identified applications is claimed and each of the above identified applications are hereby incorporated by reference herein as if fully set forth in their entirety.

BACKGROUND

The present invention is directed to a material adapted to reduce vibration and, more specifically, to a multi-layer material adapted to dissipate and evenly distribute vibrations transmitted to one side of the material.

Handles of sporting equipment, bicycles, hand tools, etc. are often made of wood, metal or polymer that transmit vibrations that can make the items uncomfortable for prolonged gripping. Sporting equipment, such as bats, balls, shoe insoles and sidewalls, also transmit vibrations during the impact that commonly occurs during athletic contests. These vibrations can be problematic in that they can potentially distract the player's attention, adversely effect performance, and/or injure a portion of a player's body.

Rigid polymer materials are typically used to provide grips for tools and sports equipment. The use of rigid polymers allows users to maintain control of the equipment but is not very effective at reducing vibrations. While it is known that softer materials provide better vibration regulation characteristics, such materials do not have the necessary rigidity for incorporation into sporting equipment, hand tools, shoes or the like. This lack of rigidity allows unintended movement of the equipment encased by the soft material relative to a user's hand or body.

Prolonged or repetitive contact with excessive vibrations can injure a person. The desire to avoid such injury can result in reduced athletic performance and decreased efficiency when working with tools.

Clearly what is needed is a multi-layer material adapted to regulate vibration that provides the necessary rigidity for effective vibration distribution; that can dampen and reduce vibrational energy; and that preferably uses materials having Shore A durometers designed for superior vibration dissipation without compromising a person's ability to manipulate an object incorporating the material.

SUMMARY

One embodiment of the present invention is directed to an insert for a shoe including a shoe insert body having a generally elongated shape with an outer perimeter configured to substantially conform to a sole of the shoe so that the shoe insert body extends along an inner surface of the shoe from a location proximate to a heel of the shoe to a toe of the shoe. The shoe insert body is generally planar and formed by a reinforced elastomer material that regulates and dissipates vibration. The shoe insert body has first and second major surfaces. The reinforced elastomer material includes first and second elastomer layers. A reinforcement layer is disposed between and generally separates the first and second elastomer layers. The reinforcement layer includes a cloth layer formed of a plurality of woven high tensile fibrous material. The plurality of woven high tensile fibrous material are connected to the first and second elastomer layers generally uniformly throughout to provide substantially complete coverage between the first and second elastomer layers. The cloth layer is generally compliant only in a direction generally perpendicular to the first major surface so as to be generally non energy storing in the direction. Wherein the high tensile fibrous material generally distributes impact energy parallel to the first major surface and into the first and second elastomer layers.

In a separate embodiment, the present invention is directed to a shoe including a shoe insert body having a generally elongated shape with an outer perimeter configured to substantially conform to a sole of the shoe so that the shoe insert body extends along an inner surface of the shoe from a location proximate to a heel of the shoe to a toe of the shoe. The shoe insert body being is generally planar and is formed by a reinforced elastomer material that regulates and dissipates vibration. The shoe insert body has first and second major surfaces. The reinforced elastomer material includes first and second elastomer layers. A reinforcement layer is disposed between and generally separates the first and second elastomer layers, the reinforcement layer includes a cloth layer formed of fiberglass. The fiberglass is connected to the first and second elastomer layers generally uniformly throughout to provide substantially complete coverage between the first and second elastomer layers. The cloth layer is generally compliant only in a direction generally perpendicular to the first major surface so as to be generally non energy storing in the direction. The fiberglass generally distributes impact energy parallel to the first major surface and into the first and second elastomer layers.

In a separate embodiment, the present invention is directed to an insert for a shoe including a shoe insert body having a generally elongated shape with an outer perimeter configured to substantially conform to a sole of the shoe so that the shoe insert body extends along an inner surface of the shoe from a location proximate to a heel of the shoe to a toe of the shoe. The shoe insert body is generally planar and is formed by a reinforced elastomer material that regulates and dissipates vibration. The shoe insert body has first and second major surfaces. The reinforced elastomer material includes first and second elastomer layers. A reinforcement layer is disposed between and generally separates the first and second elastomer layers. The reinforcement layer is generally coextensive with the shoe insert body. The reinforcement layer consisting of a cloth layer formed of a plurality of woven high tensile fibrous material. The plurality of woven high tensile fibrous material is connected to the first and second elastomer layers generally uniformly throughout to provide substantially complete coverage between the first and second elastomer layers. The cloth layer is generally compliant only in a direction generally perpendicular to the first major surface so as to be generally non energy storing in the direction. The cloth layer is generally interlocked in and generally held in position by the first and second elastomer layers. The high tensile fibrous material generally distributes impact energy parallel to the first major surface and into the first and second elastomer layers.

BRIEF DESCRIPTION OF THE DRAWINGS

The foregoing summary, as well as the following detailed description of the preferred embodiments of the present invention will be better understood when read in conjunction with the appended drawings. For the purpose of illustrating the invention, there are shown in the drawings embodiments which are presently preferred. It is understood, however, that the invention is not limited to the precise arrangements and instrumentality shown. In the drawings:

FIG. 3 is an elevational view of a baseball bat having a cover in the form of a sleeve on the handle area in accordance with this invention;

FIG. 4 is an enlarged fragmental cross-sectional view of the bat and sleeve shown in FIG. 3;

FIG. 5 is a schematic diagram showing the results in the application of shock forces on a cover in accordance with this invention;

FIG. 6 is a view similar to FIG. 4 showing an alternative sleeve mounted on a different implement;

FIG. 8 is an elevational view showing a portion of a handlebar incorporating a vibration dampening cover in accordance with this invention;

DETAILED DESCRIPTION OF THE PREFERRED EMBODIMENTS

Certain terminology is used in the following description for convenience only and is not limiting. The term "implement," as used in the specification and in the claims, means "any one of a baseball bat, racket, hockey stick, softball bat, sporting equipment, firearm, or the like." The above terminology includes the words above specifically mentioned, derivatives thereof, and words of similar import. Additionally, the words "a" and "one" are defined as including one or more of the referenced item unless specifically stated otherwise.

Figure 1:
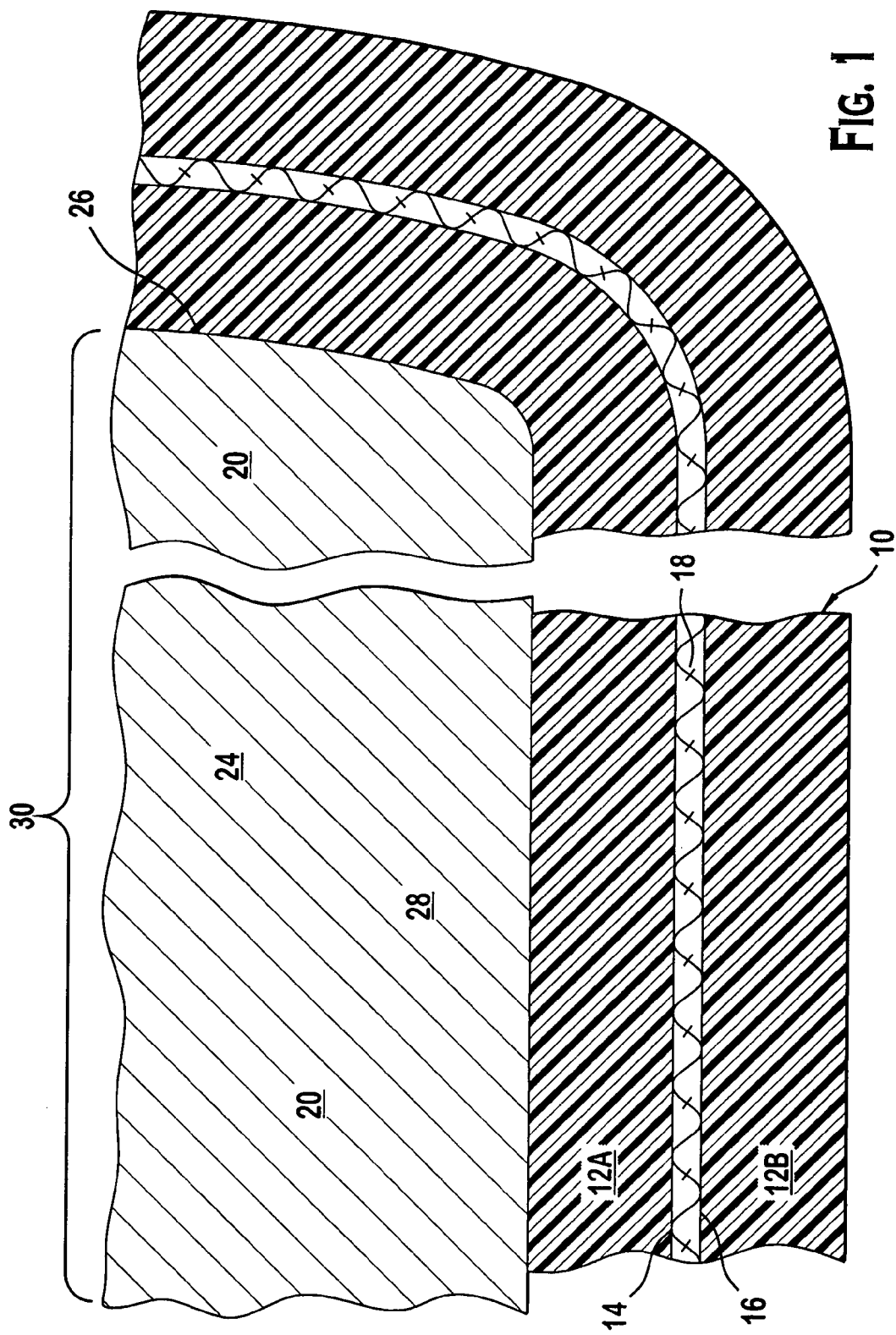
FIG. 1 is a cross-sectional view of a preferred embodiment of the material of the present invention.
Figure 2:
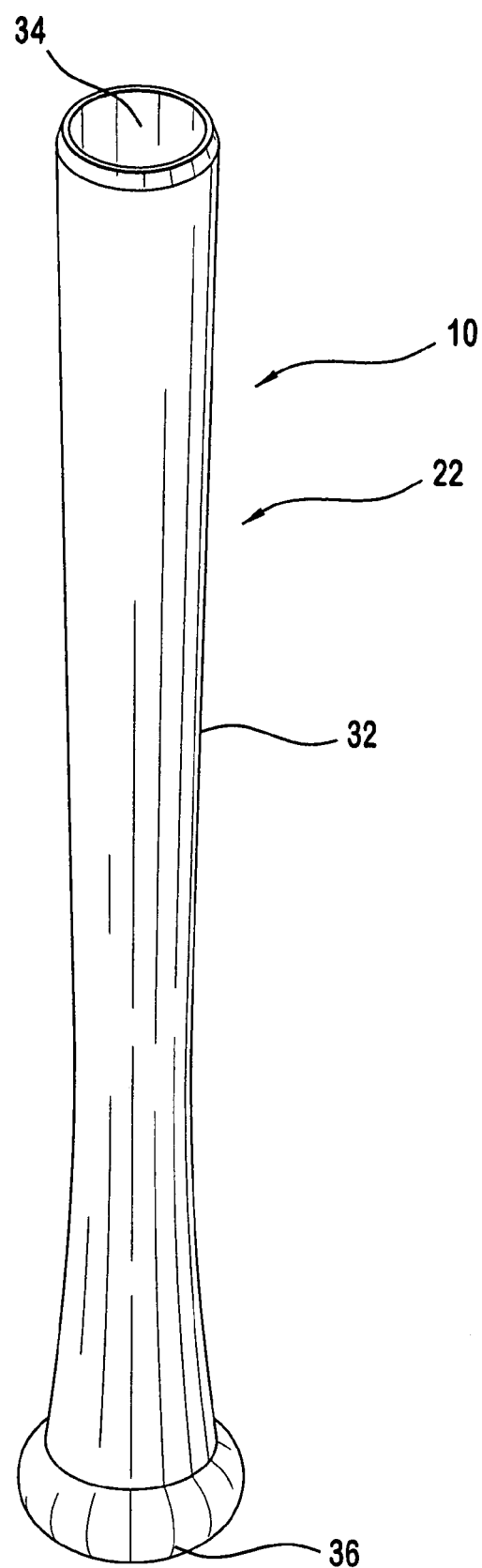
FIG. 2 is perspective view of the material of FIG. 1 configured to form a grip.

Referring to FIGS. 1 and 2, wherein like numerals indicate like elements throughout, there is shown a preferred embodiment of a material adapted to regulate vibration according to the present invention, generally designated 10. Briefly stated, the material 10 of the present invention is a multi-layer material formed by at least a first elastomer layer 12A and a layer of aramid fibers 14. The material 10 can be incorporated into athletic gear, grips for sports equipment, grips for tools, and protective athletic gear. More specifically, the material 10 can be used: to form grips for a tennis racquet, hockey sticks, golf clubs, baseball bats or the like; to form protective athletic gear for mitts, headbands, helmets, gloves, pads, or the like; to form seats or handle bar covers for bicycles, motorcycles, or the like; to form boots for skiing, roller blading or the like; to form footwear, such as shoe soles and inserts; to form grips for firearms, hand guns, rifles, shotguns, or the like; and to form grips for tools such as hammers, drills, circular saws, chisels or the like.

The first elastomer layer 12A acts a shock absorber by converting mechanical vibrational energy into heat energy. The aramid fiber layer 14 redirects vibrational energy and provides increased stiffness to the material 10 to facilitate a user's ability to control an implement 20 encased, or partially encased, by the material 10.

It is preferred that the composite material 10 have three generally independent and separate layers including the first elastomer layer 12A and a second elastomer layer 12B. Elastomer material provides vibration damping by dissipating vibrational energy. Suitable elastomer materials include, but are not limited urethane rubbers, silicone rubbers, nitrile rubbers, butyl rubbers, acrylic rubbers, natural rubbers, styrene-butadiene rubbers, and the like. In general, any suitable elastomer material can be used to form the first and second elastomer layers without departing from the scope of the present invention.

The softness of elastomer materials can be quantified using Shore A durometer ratings. Generally speaking, the lower the durometer rating, the softer the material and the more effective an elastomer layer is at absorbing and dissipating vibration because less force is channeled through the elastomer. When a soft elastomer material is squeezed, an individual's fingers are imbedded in the elastomer which increases the surface area of contact between the user's hand and creates irregularities in the outer material surface to allow a user to firmly grasp any implement 20 covered, or partially covered, by the material. However, the softer the elastomer layers 12A, 12B, the less control a user has when manipulating an implement 20 covered by the elastomer. If the elastomer layer is too soft (i.e., if the elastomer layer has too low of a Shore A durometer rating), then the implement 20 may rotate unintentionally relative to a user's hand or foot. The material 10 of the present invention is preferably designed to use first and second elastomer layers 12A, 12B having Shore A durometer ratings that provide an optimum balance between allowing a user to precisely manipulate and control the implement 20 and effectively damping vibration during use of the implement 20.

It is preferable, but not necessary, that the elastomer used with the material 10 have a Shore A durometer of between approximately ten (10) and approximately eighty (80). It is preferred that the first elastomer layer have a Shore A durometer of between approximately ten (10) and approximately twenty-five (25) and that the second elastomer layer has a Shore A durometer of between approximately twenty-five (25) and approximately forty-five (45).

The first elastomer layer 12A is preferably used to absorb vibrational energy and to convert vibrational energy into heat energy. The second elastomer layer 12B is also used to absorb vibrational energy, but also provides a compliant and comfortable grip for a user to grasp (or provides a surface for a portion of a user's body, such as the under sole of a user's foot when the material 10 is formed as a shoe insert).

In one embodiment, the first elastomer layer 12A preferably has Shore A durometer of approximately fifteen (15) and the second elastomer layer has a Shore A durometer of approximately forty-two (42). If the first and second elastomer have generally the same Shore A durometer ratings, then it is preferable, but not necessary, that the first and second elastomer layers 12A, 12B have a Shore A durometer of fifteen (15), thirty-two (32), or forty-two (42).

The fiber layer 14 is preferably, but not necessarily, formed of aramid fibers. The fibers can be woven to form a cloth layer 16 that is disposed between and generally separates the first and second elastomer layers 12A, 12B. The cloth layer 16 can be formed of aramid fibers or other types of fiber. The cloth layer 16 preferably generally separates the first and second elastomer layers 12A, 12B causing the material 10 to have three generally distinct and separate layers 12A, 12B, 14. The aramid fiber layer 14 blocks and redirects vibrational energy that passes through one of the elastomer layers 12A or 12B to facilitate the dissipation of vibrations. The aramid fibers 18 redirect vibrational energy along the length of the fibers 18. Thus, when the plurality of aramid fibers 18 are woven to form the cloth layer 16, vibrational energy emanating from the implement 20 that is not absorbed or dissipated by the first elastomer layer 12A is redistributed evenly along the material 10 by the cloth layer 16 and then further dissipated by the second elastomer layer 12B.

It is preferable that the aramid fibers 18 be formed of a suitable polyamide fiber of high tensile strength with a high resistance to elongation. However, those of ordinary skill in the art will appreciate from this disclosure that any aramid fiber suitable to channel vibration can be used to form the aramid fiber layer 14 without departing from scope of the present invention. Additionally, those of ordinary skill in the art will appreciate from this disclosure that loose aramid fibers or chopped aramid fibers can be used to form the aramid fiber layer 14 without departing from the scope of the present invention. The aramid fibers may also be formed of fiberglass.

When the aramid fibers 18 are woven to form a cloth layer 16, it is preferable that the cloth layer 16 include at least some floating aramid fibers 18. That is, it is preferable that at least some of the plurality of aramid fibers 18 are able to move relative to the remaining aramid fibers 18 of the cloth layer 16. This movement of some of the aramid fibers 18 allows at least some movement between the first elastomer layer 12A and the second elastomer layer 12B. This movement of the first elastomer layer 12A relative to the second elastomer layer 12B converts vibrational energy to heat energy. Such motion is preferably facilitated by the first and second elastomer layers 12A, 12B only being joined at discreet locations rather than being continuously joined along a common interface. This discrete contact between the first and second elastomer layers 12A, 12B at discreet locations results in the elastomer layers 12A, 12B moving relative to one another and further dissipating vibration.

Those of ordinary skill in the art will appreciate from this disclosure that the material 10 can be formed of two independent layers without departing from the scope of the present invention. Accordingly, the material 10 can be formed of a first elastomer layer 12A and an aramid fiber layer 14 (which may be woven into a cloth layer 16) that is disposed on the first elastomer 12A.

The material 10 may be configured and adapted to form an insert for shoe. When the material 10 is configured to form a shoe insert, the material 10 is preferably adapted to extend along an inner surface of the shoe from a location proximate to a heel of the shoe to the toe of the shoe. In addition to forming a shoe insert, the material 10 can be located along the sides of a shoe to protect the wearer's foot from lateral impact.

The material 10 may be configured and adapted to form a grip 22 for an implement such as a bat, having a handle 24 and a proximal end 26 (i.e., the end proximal to where the bat is normally gripped). The material 10 is preferably adapted to enclose a portion of the handle 24 and to enclose the proximal end 26 of the bat or implement 20. As best shown in FIG. 2, it is preferable that the grip 22 be formed as a single body that completely encloses the proximal end of the implement 20. The material 10 may be also be configured and adapted to form a grip 22 for a tennis racket or similar implement 20 having a handle 24 and a proximal end 26.

While the grip 22 will be described below in connection with a baseball or softball bat, those of ordinary skill in the art will appreciate that the grip 22 can be used with any of the equipment, tools, or devices mentioned above without departing from the scope of the present invention.

When the grip 22 is used with a baseball or softball bat, the grip 22 preferably covers approximately seventeen (17) inches of the handle of the bat as well as covers the knob (i.e., the proximal end 26 of the implement 20) of the bat. The configuration of the grip 22 to extend over a significant portion of the bat length contributes to increased vibrational damping. It is preferred, but not necessary, that the grip 22 be formed as a single, contiguous, one-piece member.

The baseball bat (or implement 20) has a handle 24 including a handle body 28 having a longitudinal portion 30 and a proximal end 26. The material 10 preferably encases at least some of the longitudinal portion 30 and the proximal end 26 of the handle 24. The material 10 can be produced as a composite having two generally separate and distinct layers including a first elastomer layer 12A and an aramid fiber layer 14 (which may be a woven aramid cloth layer 16) disposed on the elastomer layer 12A. The aramid fiber layer 14 is preferably formed of woven aramid fibers 18. The second elastomer layer 12B may be disposed on a major surface of the aramid fiber layer 14 opposite from the first elastomer layer 12A.

As best shown in FIG. 2, a preferred grip 22 is adapted for use with an implement 20 having a handle and a proximal handle end. The grip 22 includes a tubular shell 32 having a distal open end 34 adapted to surround a portion of the handle and a closed proximal end 36 adapted to enclose the proximal end of the handle. The tubular shell 32 is preferably formed of the material 10 which dissipates vibration. The material 10 preferably has at least two generally separate layers including a first elastomer layer 12A and an aramid fiber layer 14 (which fibers 18 may be woven to form a cloth layer 16) disposed on the first elastomer layer 12A.

Multiple methods can be used to produce the composite or multi-layer material 10 of the present invention. One method is to extrude the material by pulling an aramid fiber cloth layer 16 from a supply roll while placing the first and second elastomer layers 12A, 12B on both sides of the woven aramid cloth layer 16. A second method of producing the material 10 of the present invention is to mold the first elastomer layer 12A onto the implement 20, then to weave an aramid fiber layer thereover, and then to mold the second elastomer layer 12B thereover. Alternatively, a cloth layer 16 can be pressured fit to an elastomer layer to form the material 10. Accordingly, the cloth layer 16 can be generally embedded in or held in place by the elastomer layer. Alternatively, the cloth layer can be generally interlocked with the elastomer layer. Those of ordinary skill in the art will appreciate from this disclosure that any known method of making composite or multi-layer materials can be used to form the material 10.

The covering of the proximal end of an implement 20 by the grip 22 results in reduced vibration transmission and in improved counter balancing of the distal end of the implement 20 by moving the center of mass of the implement 20 closer to the hand of a user (i.e., closer to the proximal end 26). This facilitates the swinging of the implement 20 and can improve sports performance while reducing the fatigue associated with repetitive motion.

FIGS. 3–4 illustrate another embodiment of the present invention. As shown therein a cover in the form of a sleeve 210 is mounted on the handle or lower portion 218 of a baseball bat 210. Sleeve 210 is premolded so that it can be fit onto the handle portion of the bat 212 in a quick and convenient manner. This can be accomplished by having the sleeve 210 made of a stretchable or resilient material so that its upper end 214 would be pulled open and could be stretched to fit over the knob 217 of the bat 212. Alternatively, or in addition, sleeve 210 may be provided with a longitudinal slit 16 to permit the sleeve to be pulled at least partially open and thereby facilitate snapping the sleeve 210 over the handle 218 of the bat 212. The sleeve would remain mounted in place due to the tacky nature of the sleeve material and/or by the application of a suitable adhesive on the inner surface of the sleeve and/or on the outer surface of handle 218.

A characterizing feature of sleeve 210, as illustrated in FIGS. 3–4, is that the lower end of the sleeve includes an outwardly extending peripheral knob 2220. Knob 220 could be a separate cap snapped onto or secured in any other manner to the main portion of sleeve 210. Alternatively, knob 220 could be integral with and molded as part of the sleeve 210.

In a broad practice of this invention, sleeve 210 can be a single layer. The material would have the appropriate hardness and vibration dampening characteristics. The outer surface of the material would be tacky having high friction characteristics.

Alternatively, the sleeve 210 could be formed from a two layer laminate where the vibration absorbing material forms the inner layer disposed against the handle, with a separate tacky outer layer made from any suitable high friction material such as a thermoplastic material with polyurethane being one example. Thus, the two layer laminate would have an inner elastomer layer which is characterized by its vibration dampening ability, while the main characteristic of the outer elastomer layer is its tackiness to provide a suitable gripping surface that would resist the tendency for the user's hand to slide off the handle. The provision of the knob 220 also functions both as a stop member to minimize the tendency for the handle to slip from the user's hand and to cooperate in the vibration dampening affect.

FIG. 4 illustrates the preferred form of multilayer laminate which includes the inner vibration absorbing layer 222 and the outer tacky gripping layer 224 with an intermediate layer 226 made of a stiffening material which dissipates force. If desired layer 226 could be innermost and layer 224 could be the intermediate layer. A preferred stiffening material would be aramid fibers which could be incorporated in the material in any suitable manner as later described with respect to FIGS. 13–16. However, fiberglass or any high tensile strength fibrous material can be used as the stiffening material forming the layer. Additionally, in one embodiment, the stiffening layer is substantially embedded in or held in place by the elastomer layer(s).

FIG. 5 schematically shows what is believed to be the affect of the shock forces from vibration when the implement makes contact such as from the bat 212 striking a ball. FIG. 5 shows the force vectors in accordance with a three layer laminate, such as illustrated in FIG. 4, wherein elastomeric layers 222,224 are made of a silicone material. The intermediate layer 226 is an aramid layer made of aramid fibers. The initial shock or vibration is shown by the lateral or transverse arrows 228 on each side of the sleeve laminate 210. This causes the elastomeric layers 222,224 to be compressed along the arc 230. The inclusion of the intermediate layer 226 made from a force dissipating material spreads the vibration longitudinally as shown by the arrows 232. The linear spread of the vibration causes a rebound effect which totally dampens the vibration.

Laboratory tests were carried out at a prominent university to evaluate various grips mounted on baseball bats. In the testing, baseball bats with various grips were suspended from the ceiling by a thin thread; this achieves almost a free boundary condition that is needed to determine the true characteristics of the bats. Two standard industrial accelerometers were mounted on a specially fabricated sleeve roughly in positions where the left hand and the right hand would grip the bat. A known force was delivered to the bat with a standard calibrated impact hammer at three positions, one corresponding to the sweet spot, the other two simulating "miss hits" located on the mid-point and shaft of the bat. The time history of the force as well as the accelerations were routed through a signal conditioning device and were connected to a data acquisition device. This was connected to a computer which was used to log the data.

Two series of tests were conducted. In the first test, a control bat (with a standard rubber grip, WORTH Bat—model #C405) was compared to identical bats with several "Sting-Free" grips representing practices of the invention. These "Sting-Free" grips were comprised of two layers of pure silicone with various types of high tensile fibrous material inserted between the two layers of silicone. The types of KEVLAR, a type of aramid fiber that has high tensile strength, used in this test were referenced as follows: "005", "645", "120", "909". Also, a bat with just a thick layer of silicone but no KEVLAR was tested. With the exception of the thick silicone (which was deemed impractical because of the excessive thickness), the "645" bat showed the best reduction in vibration magnitudes.

The second series of tests were conducted using EASTON Bats (model #BK8) with the "645" KEVLAR in different combinations with silicone layers: The first bat tested was comprised of one bottom layer of silicone with a middle layer of the "645" KEVLAR and one top layer of silicone referred to as "111". The second bat test was comprised of two bottom layers of silicone with a middle layer of KEVLAR and one top layer of silicone referred to as "211". The third bat tested was comprised of one bottom layer of silicone with a middle layer of KEVLAR and two top layers of silicone referred to as "112". The "645" bat with the "111" configuration showed the best reduction in vibration magnitudes.

In order to quantify the effect of this vibration reduction, two criteria were defined: (I) the time it takes for the vibration to dissipate to an imperceptible value; and, (2) the magnitude of vibration in the range of frequencies at which the human hand is most sensitive.

The sting-free grips reduced the vibration in the baseball bats by both quantitative measures. In particular, the "645"

KEVLAR in a "111" configuration was the best in vibration reduction. In the case of a baseball bat, the "645" reduced the bat's vibration in about ⅕ the time it took the control rubber grip to do so. The reduction in peak magnitude of vibration ranged from 60% to 80%, depending on the impact location and magnitude.

It was concluded that the "645" KEVLAR grip in a "111" combination reduces the magnitude of sensible vibration by 80% that is induced in a baseball bat when a player hits a ball with it. This was found to be true for a variety of impacts at different locations along the length of the bat. Hence, a person using the "Sting-Free" grips of the invention would clearly experience a considerable reduction in the sting effect (pain) when using the "Sting-free" grip than one would with a standard grip.

In view of the above tests a particularly preferred practice of the invention involves a multilayer laminate having an aramid such as KEVLAR, sandwiched between layers of pure silicone. The above indicated tests show dramatic results with this embodiment of the invention. As also indicated above, however, the laminate could comprise other combinations of layers such as a plurality of bottom layers of silicone or a plurality of top layers of silicone. other variations include a repetitive laminate assembly wherein a vibration dampening layer is innermost with a force dissipating layer against the lower vibration dampening layer and then with a second vibration dampening layer over the force dissipating layer followed by a second force dissipating layer, etc. with the final laminate layer being a gripping layer which could also be made of vibration dampening material. Among the considerations in determining which laminate should be used would be the thickness limitations and the desired vibration dampening properties.

The various layers could have different relative thicknesses. Preferably, the vibration dampening layer, such as layer 222, would be the thickest of the layers. The outermost gripping layer, however, could be of the same thickness as the vibration dampening layer, such as layer 224 shown in FIG. 4 or could be a thinner layer since the main function of the outer layer is to provide sufficient friction to assure a firm gripping action. A particularly advantageous feature of the invention where a force dissipating stiffening layer is used is that the force dissipating layer could be very thin and still achieve its intended results. Thus, the force dissipating layer would preferably be the thinnest of the layers, although it might be of generally the same thickness as the outer gripping layer. If desired the laminate could also include a plurality of vibration dampening layers (such as thin layers of gel material) and/or a plurality of stiffening force dissipating layers. Where such plural layers are used, the various layers could differ in the thickness from each other.

FIGS. 3–4 show the use of the invention where the sleeve 210 is mounted over a baseball bat 212 having a knob 217. The same general type structure could also be used where the implement does not have a knob similar to a baseball bat knob. FIG. 6, for example, illustrates a variation of the invention wherein the sleeve 210A would be mounted on the handle 218A of an implement that does not terminate in any knob. Such implement could be various types of athletic equipment, tools, etc. The sleeve 210A, however, would still have a knob 2220A which would include an outer gripping layer 224A, an intermediate force dissipating layer 226A and an inner vibration dampening layer 222A. In the embodiment shown in FIG. 6, the handle 218A extends into the knob 220A. Thus, the inner layer 222A would have an accommodating recess 34 for receiving the handle 218A. The inner layer 222A would also be of greater thickness in the knob area as illustrated.

Figure 7:
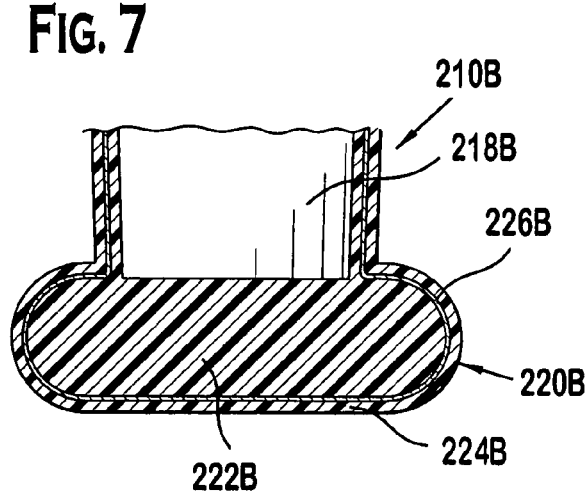
FIG. 7 is a view similar to FIGS. 4 and 6 showing still yet another form of sleeve in accordance with this invention.

FIG. 7 shows a variation where the sleeve 210B fits over handle 218B without the handle 218B penetrating the knob 220B. As illustrated, the outer gripping layer 224B would be of uniform thickness both in the gripping area and in the knob. Similarly, the intermediate force dissipating layer 226B would also be of uniform thickness. The inner shock absorbing layer 222B, however, would completely occupy the portion of the knob inwardly of the force dissipating layer 226B since the handle 218B terminates short of the knob 2220B.

Figure 8:
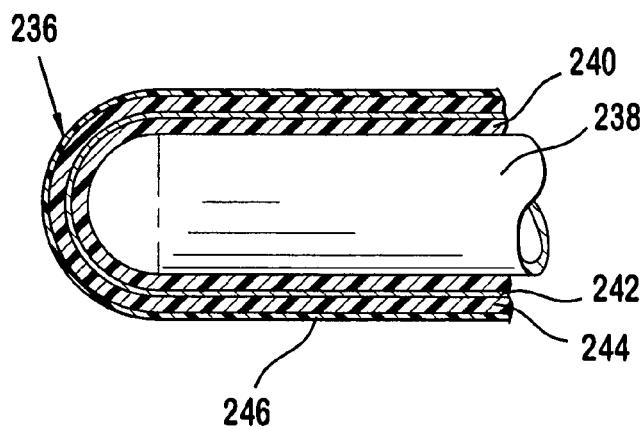
FIG. 8 is a cross-sectional longitudinal view showing an alternative cover in accordance with this invention mounted on a further type of implement.
Figure 10:
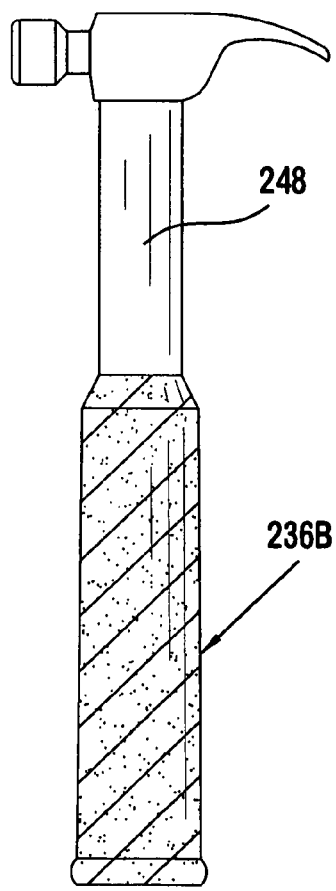
FIG. 10 is an elevational view of a hammer incorporating an abrasive dampening handle in accordance with this invention.

FIG. 8 shows a variation of the invention where the gripping cover 236 does not include a knob. As shown therein, the gripping cover would be mounted over the gripping area of a handle 238 in any suitable manner and would be held in place either by a previously applied adhesive or due to the tacky nature of the innermost vibration dampening layer 240 or due to resilient characteristics of the cover 236. Additionally, the cover might be formed directly on the handle 238. FIG. 10, for example, shows a cover 236B which is applied in the form of tape.

As shown in FIG. 8 the cover 236 includes one of the laminate variations where a force dissipating layer 242 is provided over the inner vibration dampening layer 240 with a second vibration dampening layer 244 applied over force dissipating layer 242 and with a final thin gripping layer 246 as the outermost layer. As illustrated, the two vibration dampening layers 240 and 244 are the thickest layers and may be of the same or differing thickness from each other. The force dissipating layer 242 and outer gripping layer 244 are significantly thinner.

Figure 9:
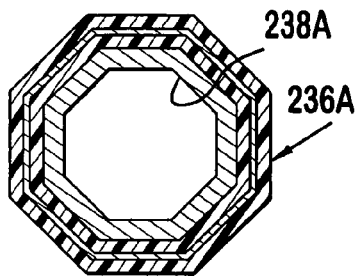
FIG. 9 is a cross-sectional end view of yet another cover in accordance with this invention.

FIG. 9 shows a cover 236A mounted over a hollow handle 238A which is of non-circular cross-section. Handle 238A may, for example, have the octagonal shape of a tennis racquet.

FIG. 10 shows a further cover 236B mounted over the handle portion of tool such as hammer 248. As illustrated, the cover 236B is applied in tape form and would conform to the shape of the handle portion of hammer 248. Other forms of covers could also be applied rather than using a tape. Similarly, the tape could be used as a means for applying a cover to other types of implements.

Figure 11:
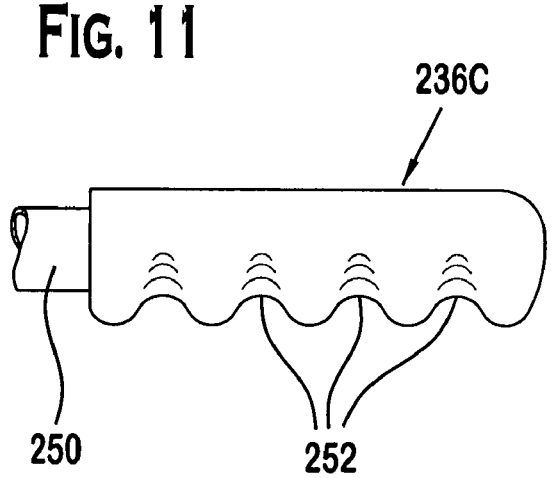
FIG. 11 is an elevational view showing a portion of a handlebar incorporating a vibration dampening cover in accordance with this invention.

FIG. 11 illustrates a cover 236C mounted over the end of a handlebar, such as the handlebar of various types of cycles or any other device having a handlebar including steering wheels for vehicles and the like. FIG. 11 also illustrates a variation where the cover 236C has an outer contour with finger receiving recesses 252. Such recesses could also be utilized for covers of other types of implements.

Figure 12:
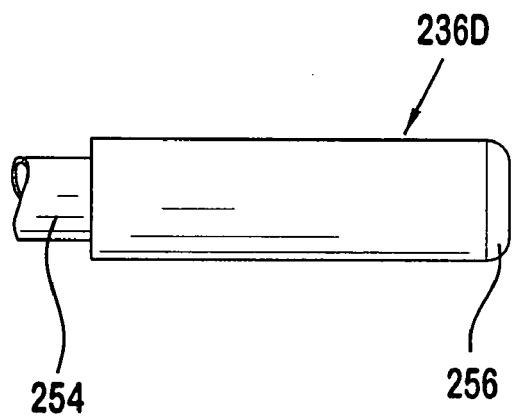
FIG. 12 is a view similar to FIG. 11 of yet another practice of this invention.

FIG. 12 illustrates a variation of the invention where the cover 236D is mounted to the handle portion of an implement 254 with the extreme end 256 of the implement being bare. This illustration is to show that the invention is intended to provide a vibration dampening gripping cover for the handle of an implement and that the cover need not extend beyond the gripping area. Thus, there could be portions of the implement on both ends of the handle without having the cover applied to those portions.

In a preferred practice of the invention, as previously discussed, a force dissipating stiffening layer is provided as an intermediate layer of a multilayer laminate where there is at least one inner layer of vibration dampening material and an outer layer of gripping material with the possibility of additional layers of vibration dampening material and force dissipating layers of various thickness. As noted the force dissipating layer could be innermost. The invention may also be practiced where the laminate includes one or more layers in addition to the gripping layer and the stiffening layer and the vibration dampening layer. Such additional layer(s) could be incorporated at any location in the laminate, depending on its intended function (e.g., an adhesive layer, a cushioning layer, etc.).

Figure 13:
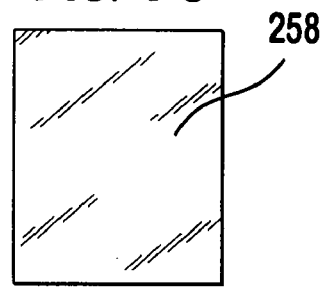
FIGS. 13–16 are plan views of various forms of the intermediate force dissipating layer which is used in certain practices of this invention.
Figure 14:
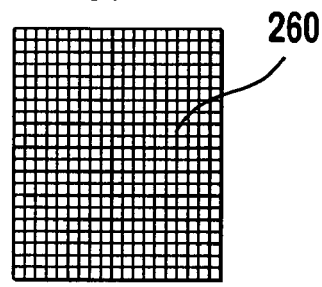
Figure 15:
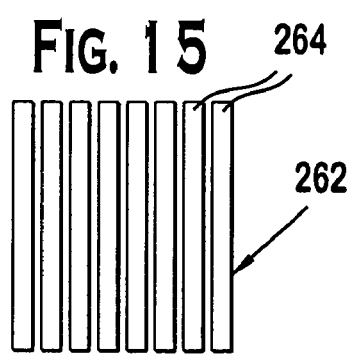
Figure 16:
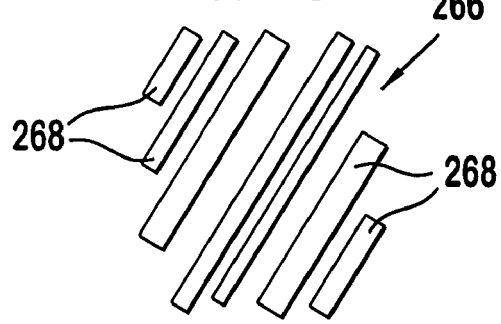

The force dissipating layer could be incorporated in the laminate in various manners. FIG. 13, for example, illustrates a force dissipating stiffening layer 258 in the form of a generally imperforate sheet. FIG. 14 illustrates a force dissipating layer 260 in the form of an open mesh sheet. This is a particularly advantageous manner of forming the force dissipating layer where it is made of KEVLAR fibers. FIG. 15 illustrates a variation where the force dissipating layer 262 is formed from a plurality of individual strips of material 264 which are parallel to each other and generally identical to each other in length and thickness as well as spacing. FIG. 16 shows a variation where the force dissipating layer 266 is made of individual strips 268 of different sizes and which could be disposed in a more random fashion regarding their orientation. Although all of the strips 268 are illustrated in FIG. 214 as being parallel, non-parallel arrangements could also be used.

The vibration dampening grip cover of this invention could be used for a wide number of implements. Examples of such implements include athletic equipment, hand tools and handlebars. For example, such athletic equipment includes bats, racquets, sticks, javelins, etc. Examples of tools include hammers, screwdrivers, shovels, rakes, brooms, wrenches, pliers, knives, handguns, air hammers, etc. Examples of handlebars include motorcycles, bicycles and various types of steering wheels.

A preferred practice of this invention is to incorporate a force dissipating layer, particularly an aramid, such as KEVLAR fiber, into a composite with at least two elastomers. One elastomer layer would function as a vibration dampening material and the other outer elastomer layer which would function as a gripping layer. The outer elastomer layer could also be a vibration dampening material. Preferably, the outer layer completely covers the composite.

There are an almost infinite number of possible uses for the composite of laminate of this invention. In accordance with the various uses the elastomer layers may have different degrees of hardness, coefficient of friction and dampening of vibration. Similarly, the thicknesses of the various layers could also vary in accordance with the intended use. Examples of ranges of hardness for the inner vibration dampening layer and the outer gripping layer (which may also be a vibration absorbing layer) are 5–70 Durometer Shore A. One of the layers may have a range of 5–20 Durometer Shore A and the other a range of 30–70 Durometer Shore A for either of these layers. The vibration dampening layer could have a hardness of less than 5, and could even be a 000 Durometer reading. The vibration dampening material could be a gel, such as a silicone gel or a gel of any other suitable material. The coefficient of friction as determined by conventional measuring techniques for the tacky and non-porous gripping layer is preferably at least 0.5 and may be in the range of 0.6–1.5. A more preferred range is 0.7–1.2 with a still more preferred range being about 0.8–1. The outer gripping layer, when also used as a vibration dampening layer, could have the same thickness as the inner layer. When used solely as a gripping layer the thickness could be generally the same as the intermediate layer, which might be about 1/20 to 1/4 of the thickness of the vibration dampening layer.

The grip cover of this invention could be used with various implements as discussed above. Thus, the handle portion of the implement could be of cylindrical shape with a uniform diameter and smooth outer surface such as the golf club handle 238 shown in FIG. 6. Alternatively, the handle could taper such as the bat handle shown in FIGS. 3–4. Other illustrated geometric shapes include the octagonal tennis racquet handle 238A shown in FIG. 9 or a generally oval type handle such as the hammer 248 shown in FIG. 10. The invention is not limited to any particular geometric shape. In addition, the implement could have an irregular shape such as a handle bar with finger receiving depressions as shown in FIG. 11. Where the outer surface of the implement handle is of non-smooth configuration the inner layer of the cover could press against and generally conform to the outer surface of the handle and the outermost gripping layer of the cover could include its own finger receiving depressions. Alternatively, the cover may be of uniform thickness of a shape conforming to the irregularities in the outer surface of the handle.

It is recognized by those skilled in the art, that changes may be made to the above-described embodiments of the invention without departing from the broad inventive concept thereof. For example, the material 10 may include additional layers (e.g., five or more layers) without departing from the scope of the claimed present invention. It is understood, therefore, that this invention is not limited to the particular embodiments disclosed, but is intended to cover all modifications which are within the spirit and scope of the invention as defined by the appended claims and/or shown in the attached drawings.

What is claimed is:

1. An insert for a shoe, comprising:
   a shoe insert body having a generally elongated shape with an outer perimeter configured to substantially conform to a sole of the shoe so that the shoe insert body extends along an inner surface of the shoe from a location proximate to a heel of the shoe to a toe of the shoe, the shoe insert body being generally planar and formed by a reinforced elastomer material that regulates and dissipates vibration, the shoe insert body having first and second major surfaces, the reinforced elastomer material comprising:
   first and second elastomer layers; and
   a reinforcement layer disposed between and generally separating the first and second elastomer layers, the reinforcement layer comprising a cloth layer formed of a plurality of woven high tensile fibrous material, the plurality of woven high tensile fibrous material being connected to the first and second elastomer layers generally uniformly throughout to provide substantially complete coverage between the first and second elastomer layers, the cloth layer being generally compliant only in a direction generally perpendicular to the first major surface so as to be generally non energy storing in the direction, wherein the high tensile fibrous material generally distributes impact energy parallel to the first major surface and into the first and second elastomer layers.

2. The insert of claim 1, wherein the reinforcement layer is generally coextensive with the shoe insert body.

3. The insert of claim 2, wherein the reinforcement layer is generally parallel to the first major surface.

4. The insert of claim 1, wherein the cloth layer generally separates the first and second elastomer layers and generally provides uniform coverage therebetween.

5. The insert of claim 1, wherein the first and second elastomer layers are formed by thermoset elastomer.

6. The insert of claim 1, wherein the reinforcement layer consists only of the cloth layer.

7. The insert of claim 1, wherein the high tensile fibrous material is an aramid.

8. The insert of claim 1, wherein the cloth layer is generally interlocked in and generally held in position by the first and second elastomer layers.

9. The insert of claim 1, wherein the cloth layer is generally embedded in and generally held in position by the first and second elastomer layers.

10. The insert of claim 1, wherein the cloth layer is generally held in position by the first and second elastomer layers to prevent sliding movement therebetween in a direction parallel to the first major material surface.

11. An insert for a shoe, comprising:
a shoe insert body having a generally elongated shape with an outer perimeter configured to substantially conform to a sole of the shoe so that the shoe insert body extends along an inner surface of the shoe from a location proximate to a heel of the shoe to a toe of the shoe, the shoe insert body being generally planar and formed by a reinforced elastomer material that regulates and dissipates vibration, the shoe insert body having first and second major surfaces, the reinforced elastomer material comprising:
first and second elastomer layers; and
a reinforcement layer disposed between and generally separating the first and second elastomer layers, the reinforcement layer comprising a cloth layer formed of fiberglass, the fiberglass being connected to the first and second elastomer layers generally uniformly throughout to provide substantially complete coverage between the first and second elastomer layers, the cloth layer being generally compliant only in a direction generally perpendicular to the first major surface so as to be generally non energy storing in the direction, wherein the fiberglass generally distributes impact energy parallel to the first major surface and into the first and second elastomer layers.

12. The insert of claim 11, wherein the reinforcement layer is generally coextensive with the shoe insert body.

13. The insert of claim 12, wherein the reinforcement layer is generally parallel to the first major surface.

14. The insert of claim 11, wherein the cloth layer generally separates the first and second elastomer layers and generally provides uniform coverage therebetween.

15. The insert of claim 11, wherein the first and second elastomer layers are formed by thermoset elastomer.

16. The insert of claim 11, wherein the reinforcement layer consists only of the cloth layer.

17. The insert of claim 11, wherein the cloth layer is generally interlocked in and generally held in position by the first and second elastomer layers.

18. The insert of claim 1, wherein the cloth layer is generally embedded in and generally held in position by the first and second elastomer layers.

19. The insert of claim 1, wherein the cloth layer is generally held in position by the first and second elastomer layers to prevent sliding movement therebetween in a direction parallel to the first major material surface.

20. An insert for a shoe, comprising:
a shoe insert body having a generally elongated shape with an outer perimeter configured to substantially conform to a sole of the shoe so that the shoe insert body extends along an inner surface of the shoe from a location proximate to a heel of the shoe to a toe of the shoe, the shoe insert body being generally planar and formed by a reinforced elastomer material that regulates and dissipates vibration, the shoe insert body having first and second major surfaces, the reinforced elastomer material comprising:
first and second elastomer layers; and
a reinforcement layer disposed between and generally separating the first and second elastomer layers, the reinforcement layer being generally coextensive with the shoe insert body, the reinforcement layer consisting of a cloth layer formed of a plurality of woven high tensile fibrous material, the plurality of woven high tensile fibrous material being connected to the first and second elastomer layers generally uniformly throughout to provide substantially complete coverage between the first and second elastomer layers, the cloth layer being generally compliant only in a direction generally perpendicular to the first major surface so as to be generally non energy storing in the direction, the cloth layer is generally interlocked in and generally held in position by the first and second elastomer layers, wherein the high tensile fibrous material generally distributes impact energy parallel to the first major surface and into the first and second elastomer layers.

* * * * *

UNITED STATES PATENT AND TRADEMARK OFFICE
CERTIFICATE OF CORRECTION

PATENT NO. : 7,150,113 B2  Page 1 of 1
APPLICATION NO. : 10/958611
DATED : December 19, 2006
INVENTOR(S) : Vito et al.

It is certified that error appears in the above-identified patent and that said Letters Patent is hereby corrected as shown below:

Column 2, line 22, delete "being".
Column 4, line 24, after "limited", insert --to--
Column 7, line 33, delete "2220" and insert --220--, therefor.
Column 8, line 50, delete ":"and insert --.--, therefor.
Column 8, line 62, delete "(I)" and insert --(1)--, therefor.
Column 9, line 15, delete "Sting-free" and insert --Sting-Free--, therefor.
Column 9, line 24, delete "other" and insert --Other--, therefor.
Column 9, line 63, delete "2220A" and insert --220A--, therefor.
Column 10, line 13, delete "2220B" and insert --220B--, therefor.
Column 11, line 23, delete "214" and insert --16--, therefor.

Signed and Sealed this

Eighth Day of May, 2007

JON W. DUDAS
*Director of the United States Patent and Trademark Office*